(12) United States Patent
Tanaka (10) Patent No.: US 10,939,245 B2
(45) Date of Patent: Mar. 2, 2021

(54) POSITION ESTIMATION SYSTEM

(71) Applicant: Murata Manufacturing Co., Ltd., Kyoto (JP)

(72) Inventor: Nobunari Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/716,791

(22) Filed: Dec. 17, 2019

(65) Prior Publication Data

US 2020/0128362 A1 Apr. 23, 2020

Related U.S. Application Data (63) Continuation of application No. PCT/JP2018/021156, filed on Jun. 1, 2018.

(30) Foreign Application Priority Data

Jun. 23, 2017 (JP) .............................. JP2017-123171

(51) Int. Cl.
*H04W 4/029* (2018.01)
*G01S 5/02* (2010.01)

(52) U.S. Cl.
CPC ........... *H04W 4/029* (2018.02); *G01S 5/0221* (2013.01); *G01S 5/0252* (2013.01)

(58) Field of Classification Search
CPC ....... H04W 4/024; H04W 4/25; H04W 4/029; H04W 64/00; H04W 64/003; H04W 4/02;
(Continued)

(56) References Cited

U.S. PATENT DOCUMENTS

2005/0176442 A1 8/2005 Ju
2016/0088438 A1* 3/2016 O'Keeffe ................ H04W 4/21
455/456.2
(Continued)

FOREIGN PATENT DOCUMENTS

JP 2005-229616 A 8/2005
JP 2005-341516 A 12/2005

OTHER PUBLICATIONS

International Search Report for PCT/JP2018/021156 dated Sep. 4, 2018.
(Continued)

*Primary Examiner* — Jean A Gelin
(74) *Attorney, Agent, or Firm* — Pearne & Gordon LLP (57) ABSTRACT

A position detection system (1) includes a plurality of receivers (3) that receive a radio wave from a transmitter (2) and a control unit (4) connected to these receivers (3). The control unit (4) estimates the presence position of the transmitter (2) using machine learning from advance data obtained beforehand. The advance data is data based on a radio wave received by the receiver (3) in a state where a transmitter (11) is placed at a position where its coordinates are clear within an area. The control unit (4) narrows down a presence range of the transmitter (2) in a step-by-step manner by the bisection method using data of the radio waves received by all the receivers (3) and determines one area from among a plurality of areas divided in advance within the area as the presence position of the transmitter (2).

18 Claims, 9 Drawing Sheets

(58) Field of Classification Search
CPC ........ G01S 5/02; G01S 5/0221; G01S 5/0252; G01S 5/02521
See application file for complete search history.

(56) References Cited

U.S. PATENT DOCUMENTS

2017/0364088 A1* 12/2017 Grufman .............. A01D 34/008
2018/0011953 A1*  1/2018 Micks ................... G06N 20/00
2018/0231979 A1*  8/2018 Miller ............... G06Q 30/0266
2018/0234797 A1*  8/2018 Ledvina ............... H04W 4/023
2018/0365975 A1* 12/2018 Xu ......................... G01S 7/415

OTHER PUBLICATIONS

Written Opinion for PCT/JP2018/021156 dated Sep. 4, 2018.
Tsujino, et al., "A Positioning System based on RSSI values from Sensor Devices usning [sic] Machine Learning and its Applications", The 23rd Annual Conference of the Japanese Society for Artificial Intelligence, Department Computer Science, Nagoya Institute of Technology, 2009.

* cited by examiner

| | POSITION OF TRANSMITTER | | DETERMINATION RESULT IN X DIRECTION | | | | | | | DETERMINATION RESULT IN Y DIRECTION | | | | | | |
|---|---|---|---|---|---|---|---|---|---|---|---|---|---|---|---|---|
| | X DIRECTION | Y DIRECTION | X1 | X2 | X3 | X4 | X5 | X6 | X7 | Y1 | Y2 | Y3 | Y4 | Y5 | Y6 | Y7 |
| P1 | 0.5m | 3.5m | 0 | 0 | 0 | 0 | 0 | 0 | 0 | 1 | 1 | 1 | 0 | 0 | 0 | 0 |
| P2 | 4.5m | 7.5m | 1 | 1 | 1 | 0 | 0 | 0 | 0 | 1 | 1 | 1 | 1 | 1 | 1 | 0 |
| P3 | 7.5m | 1.5m | 1 | 1 | 1 | 1 | 1 | 1 | 0 | 1 | 0 | 0 | 0 | 0 | 0 | 0 |

Fig.9

POSITION ESTIMATION SYSTEM

This is a continuation of International Application No. PCT/JP2018/021156 filed on Jun. 1, 2018 which claims priority from Japanese Patent Application No. 2017-123171 filed on Jun. 23, 2017. The contents of these applications are incorporated herein by reference in their entireties.

BACKGROUND OF THE DISCLOSURE

Field of the Disclosure

The present disclosure relates to a position estimation system that estimates a position of a transmitter.

Description of the Related Art

In general, position estimation systems that estimate a position of a movable transmitter (a mobile station) such as a wireless terminal are known in the art (for example, see Non-Patent Document 1). The Non-Patent Document 1 discloses a system in which receivers are arranged at four corners of a rectangular area where the position estimation is performed and a position of a transmitter inside the area is estimated. In this system, a transmitter is placed at a plurality of locations within the area in advance, a signal from the transmitter is received at the receivers, and the relationships between the values of the received signal strength (RSSI values) and the positions of the transmitter are learned in advance. After doing that, when a transmitter is placed within the area, of the positions having been measured in advance, the one having the most similar characteristic feature is estimated as the position of the transmitter.

Non-Patent Document 1: Tomotaka Tsujino and three others, "A Positioning System based on RSSI values from Sensor Devices usning [sic] Machine Learning and its Applications", The 23rd Annual Conference of the Japanese Society for Artificial Intelligence, 1H1-2, June 2009.

BRIEF SUMMARY OF THE DISCLOSURE

Note that in the position estimation system disclosed in the Non-Patent Document 1, the area where the position estimation is performed is divided into a plurality of (for example, four) blocks in advance, and one of the plurality of blocks having a high probability of the presence of the transmitter is estimated using the receivers arranged in the respective blocks. However, in the case where the area is further divided into smaller areas for estimation, a greater number of receivers will be needed. In addition, for example, in the environment where multiple reflections and the like occur, the probability of the presence of the transmitter may sometimes become higher in two or more blocks. Therefore, the estimated position of the transmitter is liable to be unstable.

The present disclosure is made in view of the foregoing issues of the prior art technique, and an object of the present disclosure is to provide a position estimation system capable of estimating a position of a transmitter without the need of a receiver in each receiving area of a plurality of the receiving areas.

In order to resolve the foregoing issues, the present disclosure is a position estimation system including a plurality of receivers that receive a radio wave from a transmitter and a control unit connected to these receivers using wired or wireless connection, wherein the control unit estimates a presence position of the transmitter using machine learning from advance data obtained beforehand, and the presence position of the transmitter is estimated by narrowing down a presence range of the transmitter in a step-by-step manner by a bisection method using data of the radio waves received by all the receivers.

The present disclosure enables to estimate the position of the transmitter without the need of the receiver in each receiving area of a plurality of the receiving areas.

DETAILED DESCRIPTION OF THE DISCLOSURE

Hereinafter, position estimation systems according to embodiments of the present disclosure will be described in detail with reference to the attached drawings.

Figure 1:
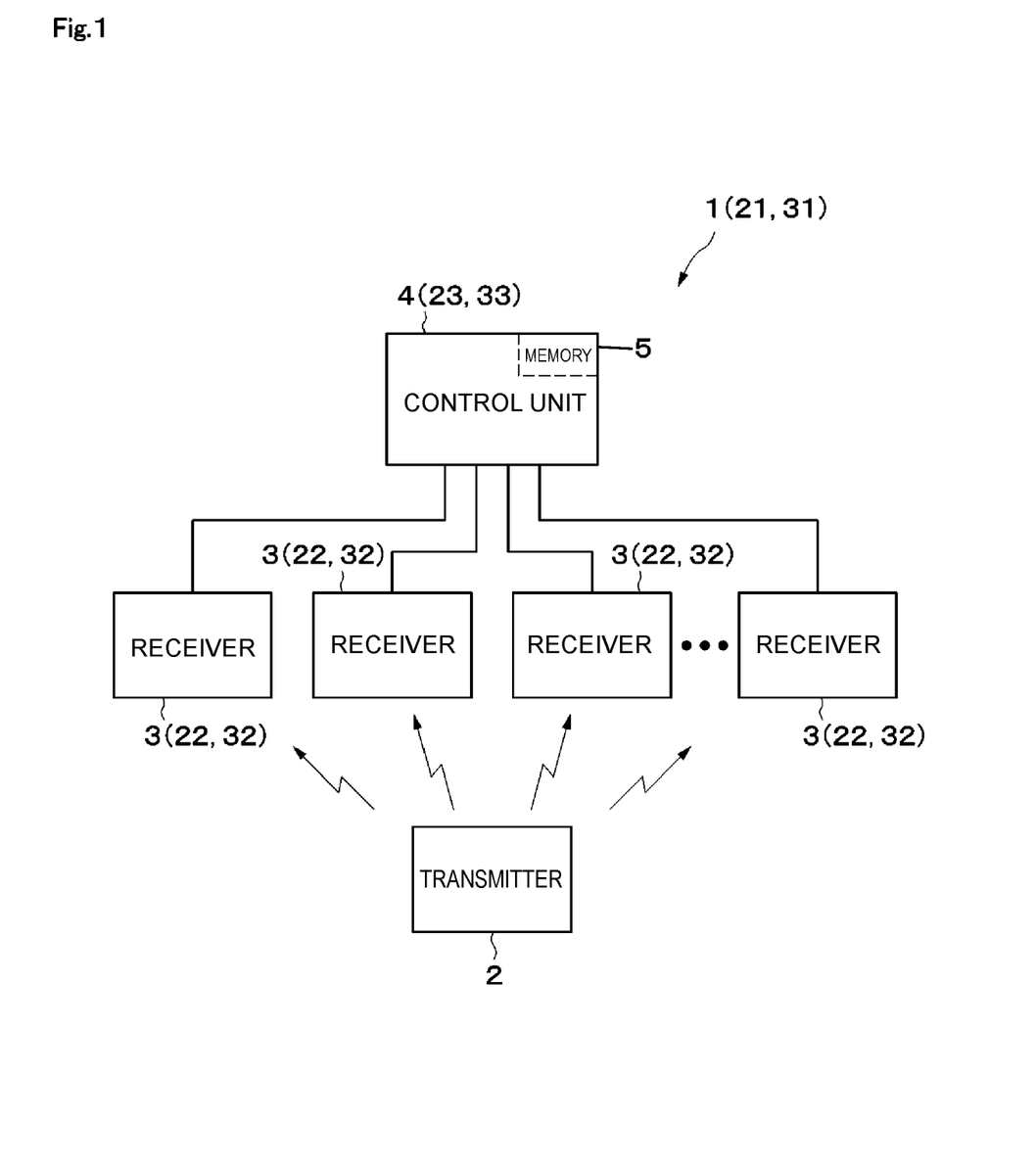
FIG. 1 is a block diagram illustrating an overall configuration of a position estimation system according to first to third embodiments.
Figure 2:
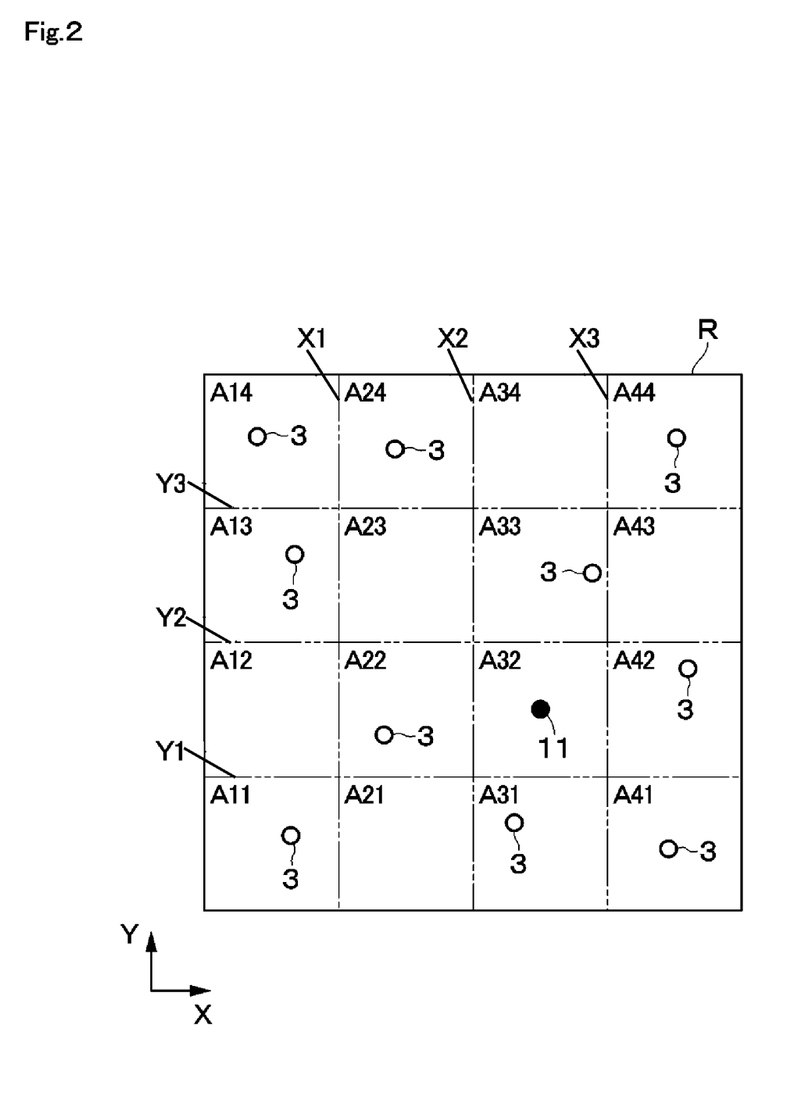
FIG. 2 is an explanatory diagram illustrating an arrangement of receivers in the first embodiment.

FIG. 1 and FIG. 2 illustrate a position estimation system 1 according to the first embodiment. The position estimation system 1 includes a plurality of receivers 3 that receive a radio wave from a transmitter 2 and a control unit 4 connected to these receivers 3 using wired or wireless connection.

The transmitter 2 is, for example, a movable wireless terminal that is a target to be detected and is a mobile station. The transmitter 2 includes an oscillator, a modulator, an amplifier, and an antenna (none of them is illustrated in the drawing). The transmitter 2 transmits a radio wave including various signals toward the receivers 3. The radio wave transmitted from the transmitter 2 may be, for example, a radio wave of the band being used in Wireless LAN or Near Field Communication (2.4 GHz band, 5 GHz band) or a radio wave of a different frequency band.

The receiver 3 constitutes a fixed station placed at a predetermined location. As illustrated in FIG. 2, a plurality of the receivers 3 are placed at positions different from each other in an area R where a position of the transmitter 2 is estimated. The receiver 3 includes an oscillator, a modulator, and an antenna (none of them is illustrated in the drawing). These receivers 3 receive a radio wave transmitted from the transmitter 2. At this time, the receiver 3 obtains a value of the received signal intensity (RSSI value) as data based on the radio wave from the transmitter 2. The receiver 3 outputs the RSSI value (positioning data) to the control unit 4.

FIG. 2 illustrates an exemplary case where for example the total of 10 receivers 3 are placed in the area R where a position of the transmitter 2 is determined, however, the position of the receiver 3 is not limited within the area R. The receiver 3 may also be placed around the area R or outside the area R within the range where a radio wave from the transmitter 2 located within the area R can be received. The number of the receivers 3 is smaller than the number (for example, 16) of areas A11 to A44 (receiving areas) where a position of the transmitter 2 is determined.

The control unit 4 is connected to all the receivers 3 using wired or wireless connection. The control unit 4 is, for example, made up of a micro-computer and the like. The control unit 4 includes a memory 5 (memory unit) for storing advance data and a program of a position estimation process. The control unit 4 receives the RSSI values of the transmitter 2 from all the receivers 3 and estimates the position of the transmitter 2 based on these RSSI values by running the program of the position estimation process illustrated in FIG. 3 and FIG. 4.

The control unit 4 estimates the presence position of the transmitter 2 using machine learning from the advance data. The advance data are data of RSSI values when a transmitter 11 (transmitter for obtaining data) is placed at a predetermined position whose coordinates are clear. The advance data are obtained using the following procedure.

First, the entirety of the area R where the position of the transmitter 2 is estimated is divided by a perfect power of 2 in the X direction and the Y direction that are orthogonal to each other. The area R may have any shape and is not necessarily to have a square shape. According to this, the area R is divided into a plurality of areas arranged in a matrix form. Note that FIG. 2 illustrates an exemplary case where the area R is divided into quarters in each of the X direction and the Y direction. Therefore, in the area R, the total of 16 areas A11 to A44 are formed. At this time, the subscript x of area Axy corresponds to a position in the X direction and increases its numerical value from one side of the X direction (left side of FIG. 2) to the other side of the X direction (right side of FIG. 2). The subscript y of area Axy corresponds to a position in the Y direction and increases its numerical value from one side of the Y direction (lower side of FIG. 2) to the other side of the Y direction (upper side of FIG. 2).

Next, the transmitter 11 is prepared for obtaining the advance data. The transmitter 11 is a transmitter for transmitting a radio wave including information necessary for determining the position and may be any transmitter so long as, for example, this transmitter can transmit the same radio wave as that of the transmitter 2. Then, the transmitter 11 is placed at a predetermined position (position whose coordinates are clear) within the area R. In this state, the receiver 3 receives a radio wave from the transmitter 11 and outputs the RSSI value based on the received radio wave to the control unit 4. The foregoing operation is repeated at arbitrary positions within the area R, where the coordinates are clear.

Note that at the time of obtaining the advance data, the position of the transmitter 11 is not limited to the positions of the areas A11 to A44. In other words, the positions and the number of measurements of advance learning do not depend on the area R or the number of the areas, and it is only necessary to determine the coordinate value of the transmitter 11 when the advance data is obtained. Note that however estimation accuracy cannot be secured unless there are advance data with the number of the areas and the distribution comparable to those in the areas A11 to A44. Therefore, the advance data are obtained in consideration of a desired estimation accuracy. The control unit 4 performs machine learning (supervised learning) using the advance data for which the coordinates are known and determines the correspondence relationship between the RSSI values of all the receivers 3 and the coordinates of the location of the transmitters 11. At this time, for the machine learning using the advance data, a known algorithm such as, for example, a support vector machine (SVM), a decision tree, or the like can be used.

The control unit 4 narrows down the presence range of the transmitter 2 whose position is yet unknown in a step-by-step manner by the bisection method using data (RSSI values) of a radio wave received by all the receivers 3 and estimates the presence position of the transmitter 2. Specifically, the control unit 4 determines one area of the areas A11 to A44 in the area R as the presence position of the transmitter 2.

Next, the position estimation process to be performed by the control unit 4 according to the present embodiment is described using FIG. 1 to FIG. 4.

Figure 3:
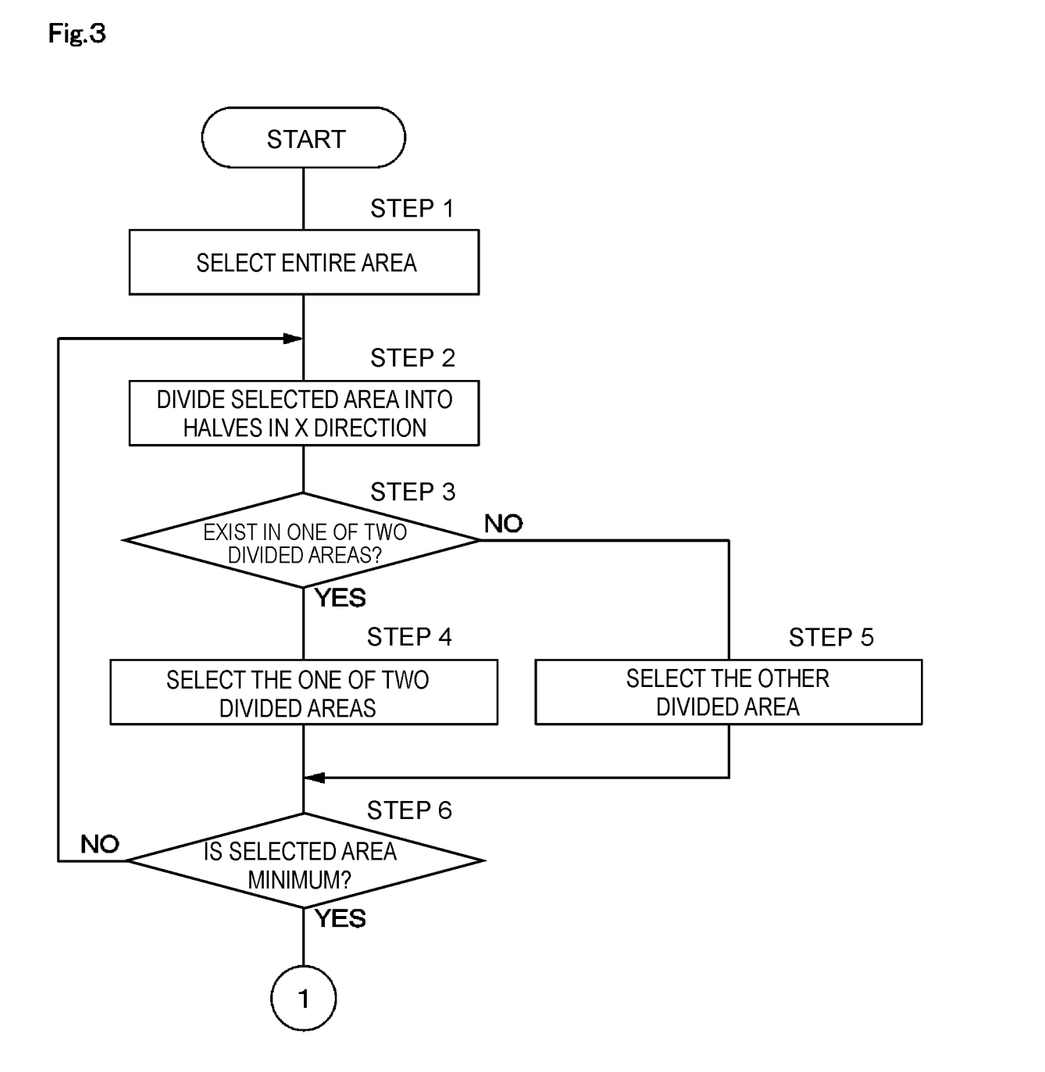
FIG. 3 is a flowchart illustrating a position estimation process that estimates a position of a transmitter.

First, the position of the transmitter 2 in the X direction is estimated by performing steps 1 to 6.

In step 1, all the areas A11 to A44 located inside the area R are selected. In other words, in step 1, the entirety of the area R is selected as an initial state for performing a X-direction estimation process. In the following step 2, the selected area is divided into halves in the X direction.

In step 3, it is determined whether the transmitter 2 is present in one of the two divided areas or not. For example, when all the areas A11 to A44 are divided into halves in the X direction (left-right direction of FIG. 2), the areas A31 to A44 located in the other side of the X direction (right side of FIG. 2) constitute the one of the two divided areas, and the areas A11 to A24 located in the one side of the X direction (left side of FIG. 2) constitute the other divided area. Alternatively, the areas A11 to A24 located in the one side of the X direction (left side of FIG. 2) may constitute the one of the two divided areas, and the areas A31 to A44 located in the other side of the X direction (right side of FIG. 2) may constitute the other divided area. The relationship between the one of the two divided areas and the other divided area is similar even when the area is narrowed down in the X direction.

The control unit 4 calculates the probability PxA that the transmitter 2 is present in the one of the two divided areas and the probability PxB that the transmitter 2 is present in the remaining area (area equal to the entire area R except the one of the two divided areas). Of these two probabilities PxA and PxB, the control unit 4 determines whether the probability PxA is higher than the probability PxB (PxA>PxB) or not.

When the probability PxA is higher than the probability PxB, it is determined as "YES" in step 3, and the process proceeds to step 4. In step 4, the one of the two divided areas is selected, and the process proceeds to step 6.

On the other hand, when the probability PxA is lower than the probability PxB, it is determined as "NO" in step 3, and the process proceeds to step 5. In step 5, the other divided area is selected, and the process proceeds to step 6.

In the following step 6, it is determined whether the size of the area selected in step 4 or step 5 is minimum in the X direction or not. In other words, it is determined whether the area selected in step 4 or step 5 is a single unit in the X direction (one column) or not. When it is determined as "NO" in step 6, the size of the selected area is not narrowed down to the minimum unit and thus can be further divided. Therefore, the processing in step 2 and beyond are repeated.

On the other hand, when it is determined as "YES" in step 6, the size of the selected area is narrowed down to the minimum unit. Therefore, the process proceeds to step 7.

Figure 4:
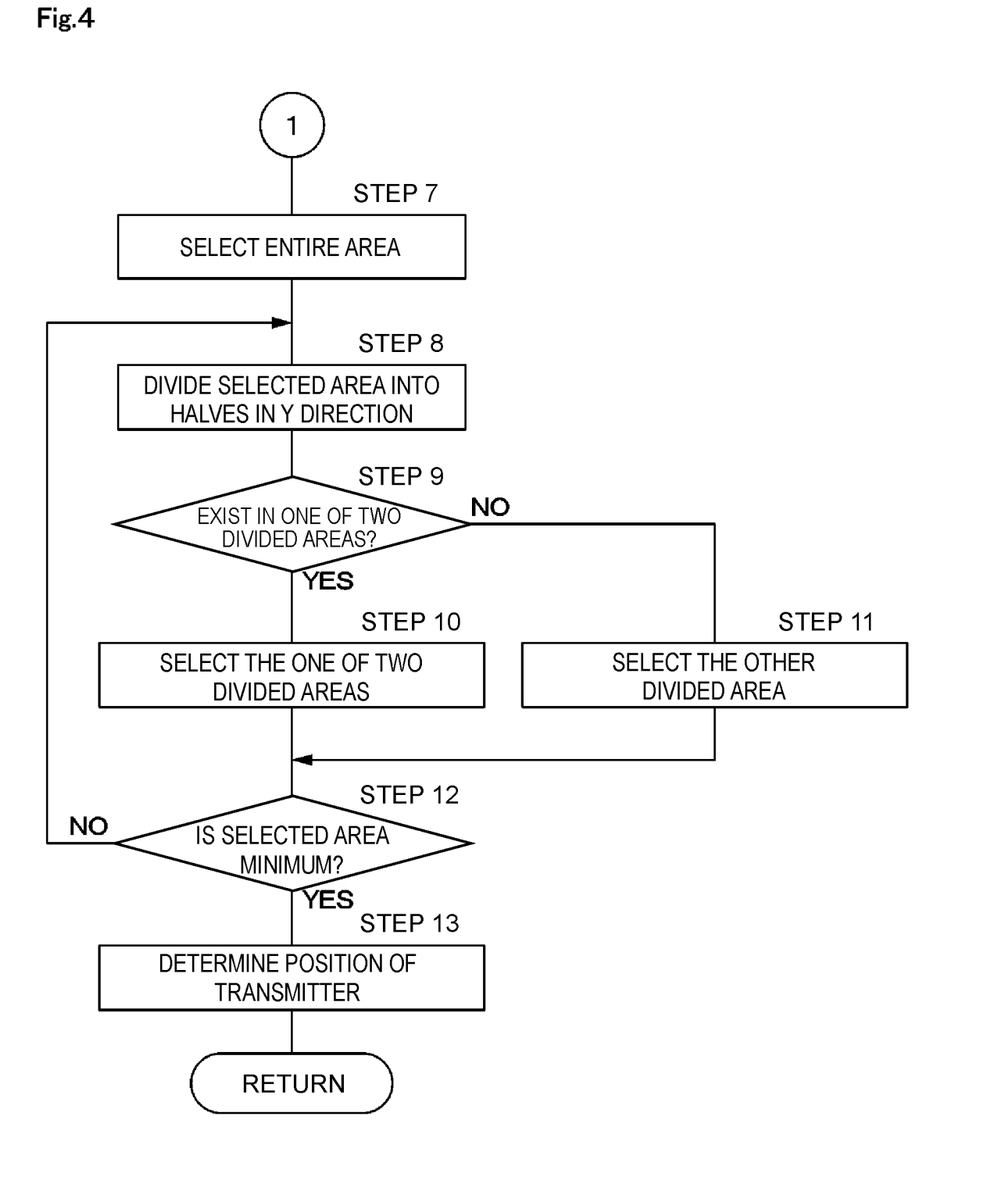
FIG. 4 is a flowchart that follows FIG. 3.

Next, the position of the transmitter 2 in the Y direction is estimated by performing steps 7 to 12.

In step 7, all the areas A11 to A44 located inside the area R are selected. In other words, in step 7, the entirety of the area R is selected as an initial state for performing a Y-direction estimation process. In the following step 8, the selected area is divided into halves in the Y direction.

In step 9, it is determined whether the transmitter 2 is present in one of the two divided areas or not. For example, when all the areas A11 to A44 are divided into halves in the Y direction (upper-lower direction of FIG. 2), the areas A13 to A44 located in the other side of the Y direction (upper side of FIG. 2) constitute the one of the two divided areas, and the areas A11 to A42 located in the one side of the Y direction (lower side of FIG. 2) constitute the other divided area. Alternatively, the areas A11 to A42 located in the one side of the Y direction (lower side of FIG. 2) may constitute the one of the two divided areas, and the areas A13 to A44 located in the other side of the Y direction (upper side of FIG. 2) may constitute the other divided area. The relationship between the one of the two divided areas and the other divided area is similar even when the area is narrowed down in the Y direction.

The control unit 4 calculates the probability PyA that the transmitter 2 is present in one of the two divided areas and the probability PyB that the transmitter 2 is present in the remaining area (area equal to the entire area R except the one of the two divided areas). Of these two probabilities PyA and PyB, the control unit 4 determines whether the probability PyA is higher than the probability PyB (PyA>PyB) or not.

When the probability PyA is higher than the probability PyB, it is determined as "YES" in step 9, and the process proceeds to step 10. In step 10, the one of the two divided areas is selected, and the process proceeds to step 12.

On the other hand, when the probability PyA is lower than the probability PyB, it is determined as "NO" in step 9, and the process proceeds to step 11. In step 11, the other divided area is selected, and the process proceeds to step 12.

In the following step 12, it is determined whether the size of the area selected in step 10 or step 11 is minimum in the Y direction or not. In other words, it is determined whether the area selected in step 10 or step 11 is a single unit in the Y direction (one row) or not. When it is determined as "NO" in step 12, the size of the selected area is not narrowed down to the minimum unit and thus can be further divided. Therefore, the processing in step 8 and beyond are repeated.

On the other hand, when it is determined as "YES" in step 12, the size of the selected area is narrowed down to the minimum unit. Therefore, the process proceeds to step 13 where one area is determined as the position where the transmitter 2 is present. In other words, in step 13, the control unit 4 obtains one area where the one column area for the X direction determined by the processing of steps 1 to 6 and the one row area for the Y direction determined by the processing of steps 7 to 12 overlap each other. This enables the control unit 4 to determine one of the plurality of the areas A11 to A44 arranged in a matrix form as the presence position of the transmitter 2.

Note that steps 1 to 6 of FIG. 3 illustrate a specific example of a X-direction estimation processing unit that estimates the position of the transmitter 2 in the X direction.

Steps 7 to 12 of FIG. 4 illustrate a specific example of a Y-direction estimation processing unit that estimates the position of the transmitter 2 in the Y direction. Step 13 of FIG. 4 illustrates a specific example of an area determination unit that determines a single area from among the plurality of the areas A11 to A44 as the presence position of the transmitter 2.

Further, either the X-direction estimation processing unit illustrated in steps 1 to 6 or the Y-direction estimation processing unit illustrated in steps 7 to 12 may be performed first, or both may be performed at the same time using parallel processing.

The position estimation system 1 according to the first embodiment has the foregoing configuration, and its operation is described below with reference to FIG. 2, FIG. 5, and FIG. 6.

Figure 5:
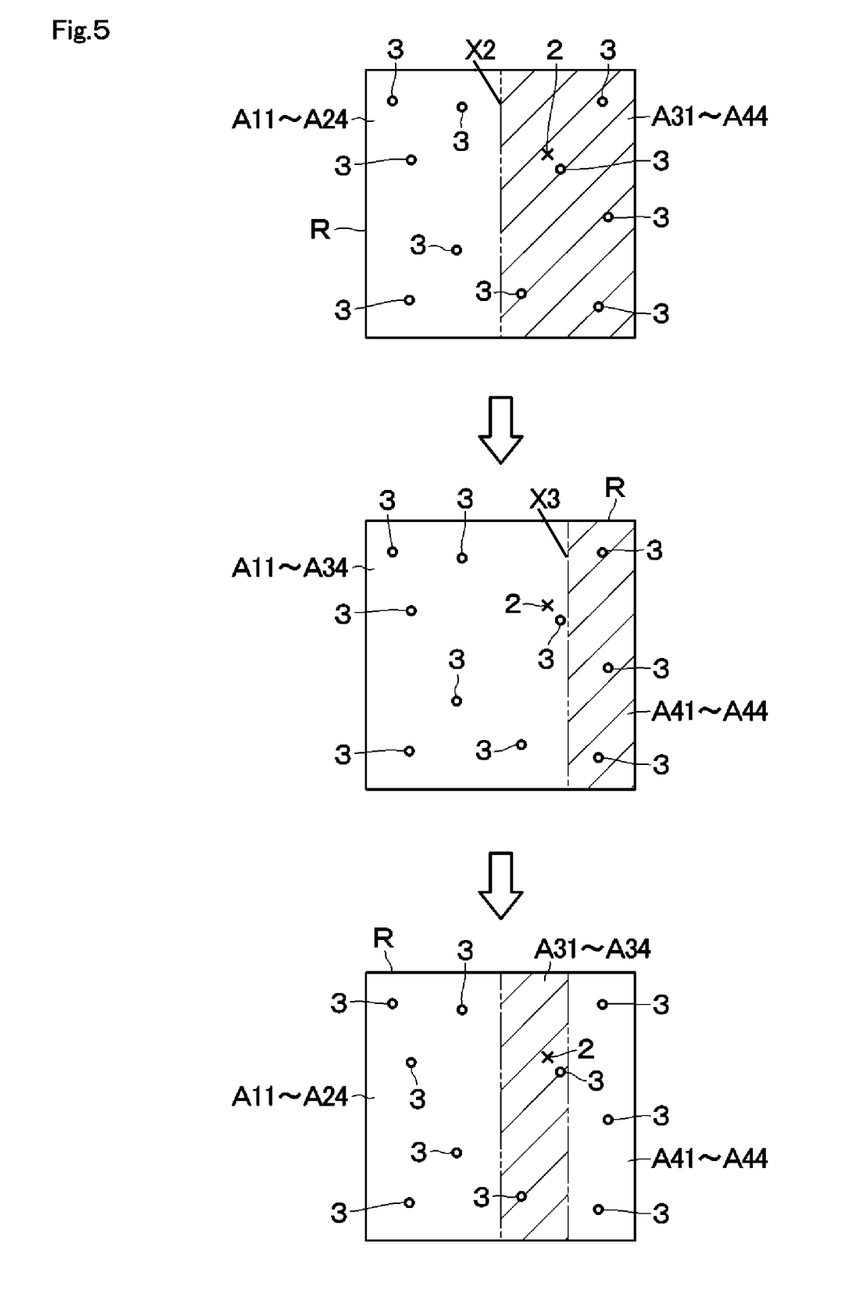
FIG. 5 is an explanatory diagram illustrating a procedure that determines the position of the transmitter in X direction using a bisection method.
Figure 6:
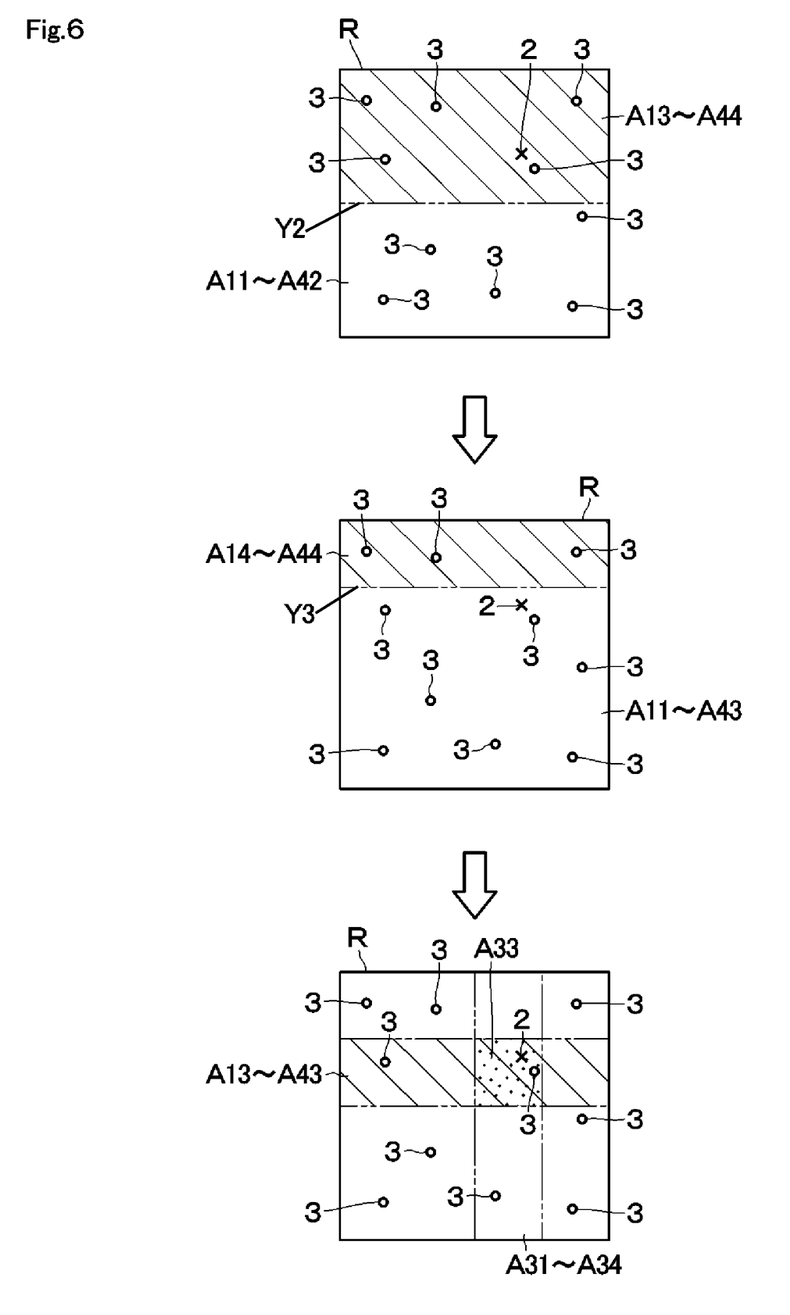
FIG. 6 is an explanatory diagram illustrating a procedure that determines the position of the transmitter in Y direction using the bisection method.

FIG. 5 and FIG. 6 illustrate a procedure that determines one area of the area R that is divided into a plurality of areas as the position of the transmitter 2. Note that FIG. 2 illustrates the case where the area R is divided into four areas in both the X direction and the Y direction. Therefore, the total of 16 areas A11 to A44 are present in the area R. FIG. 5 and FIG. 6 illustrate an estimation procedure in the case where the transmitter 2 is placed in the area A33 that is the third location from the left in the X direction and the third location from the bottom in the Y direction in the area R.

First, all the areas A11 to A44 included in the area R are selected. At this time, as illustrated in the top section of FIG. 5, the areas A11 to A44 are divided into halves at a middle position X2 of the areas A11 to A44 in the X direction. This divides the areas A11 to A44 into the areas A11 to A24 and the areas A31 to A44. In this state, the control unit 4 selects one of the areas A11 to A24 and the areas A31 to A44 (for example, the areas A31 to A44) and determines whether or not the probability that the transmitter 2 is present in the selected areas A31 to A44 is higher than the probability that the transmitter 2 is present in the remaining areas A11 to A24.

At this time, the control unit 4 compares the RSSI values of a radio wave received by all the receivers 3 with the advance data obtained beforehand.

When the probability of the presence in the areas A31 to A44 is higher than the probability of the presence in the remaining areas A11 to A24, the areas A31 to A44 are divided into halves at a middle position X3 of the areas A31 to A44 in the X direction (see the middle section of FIG. 5). This divides the areas A31 to A44 into the areas A31 to A34 and the areas A41 to A44. In this state, the control unit 4 selects one of the areas A31 to A34 and the areas A41 to A44 (for example, the areas A41 to A44) and determines whether or not the probability that the transmitter 2 is present in the selected areas A41 to A44 is higher than the probability that the transmitter 2 is present in the remaining areas A11 to A34.

Specifically, the probability that the transmitter 2 is present in the areas A41 to A44 is compared with the probability that the transmitter 2 is present in the remaining areas A11 to A34 of the area R. When the probability that the transmitter 2 is present in the areas A41 to A44 is higher than the probability that the transmitter 2 is present in the remaining areas A11 to A34, the areas A41 to A44 are selected. On the other hand, when the probability that the transmitter 2 is present in the remaining areas A11 to A34 is higher than the probability that the transmitter 2 is present in the areas A41 to A44, the areas A31 to A34 of the remaining areas A11 to A34 are selected, the areas A31 to A34 being included in (overlap with) the areas A31 to A44 that has been selected in the previous stage. As illustrated in the bottom section of FIG. 5, this enables to determine the areas A31 to A34 as the position in the X direction where the transmitter 2 is present.

Next, the control unit 4 performs a similar process for the Y direction. Therefore, first, all the areas A11 to A44 included in the area R are selected. At this time, as illustrated in the top section of FIG. 6, the areas A11 to A44 are divided into halves at a middle position Y2 of the areas A11 to A44 in the Y direction. This divides the areas A11 to A44 into the areas A11 to A42 and the areas A13 to A44. In this state, the control unit 4 selects one of the areas A11 to A42 and the areas A13 to A44 (for example, the areas A13 to A44) and determines whether or not the probability that the transmitter 2 is present in the selected areas A13 to A44 is higher than the probability that the transmitter 2 is present in the remaining areas A11 to A42.

When the probability of the presence in the areas A13 to A44 is higher than the probability of the presence in the remaining areas A11 to A42, the areas A13 to A44 are divided into halves at a middle position Y3 of the areas A13 to A44 in the Y direction (see the middle section of FIG. 6). This divides the areas A13 to A44 into the areas A13 to A43 and the areas A14 to A44. In this state, the control unit 4 selects one of the areas A13 to A43 and the areas A14 to A44 (for example, the areas A14 to A44) and determines whether or not the probability that the transmitter 2 is present in the selected areas A14 to A44 is higher than the probability that the transmitter 2 is present in the remaining areas A11 to A43. Specifically, the probability that the transmitter 2 is present in the areas A14 to A44 is compared with the probability that the transmitter 2 is present in the remaining areas A11 to A43 of the area R.

When the probability that the transmitter 2 is present in the areas A14 to A44 is higher than the probability that the transmitter 2 is present in the remaining areas A11 to A43, the areas A14 to A44 are selected. On the other hand, when the probability that the transmitter 2 is present in the remaining areas A11 to A43 is higher than the probability that the transmitter 2 is present in the areas Al4 to A44, the areas A13 to A43 of the remaining areas A11 to A43 are selected, the areas A13 to A43 being included in (overlapped with) the areas A13 to A44 that has been selected in the previous stage. As illustrated in the bottom section of FIG. 6, this enables to determine the areas A13 to A43 as the position in the Y direction where the transmitter 2 is present. As a result, the positions in the X direction and the Y direction are determined within the area R. Thus, as the final position of the transmitter 2, the area A33 where the determined areas A31 to A34 for the X direction and the determined areas A13 to A43 for the Y direction are overlapped is determined.

Accordingly, the first embodiment enables the control unit 4 to narrow down the presence range of the transmitter 2 in a step-by-step manner by the bisection method and estimate the presence position of the transmitter 2. Therefore, compared with the case where the presence position of the transmitter 2 is estimated using single estimation processing, the first embodiment facilitates the stability of the estimated position of the transmitter 2 and enables to determine one area in the end.

Further, at the time of narrowing down the presence range of the transmitter 2, if only the data from the receiver 3 inside a narrowed range are used, the number of the receivers 3 gradually decreases. Thus, the position estimation accuracy decreases. Whereas, the position estimation system 1 according to the first embodiment estimates the presence position of the transmitter 2 by using the data of the radio waves received by all the receivers 3 even when the presence range of the transmitter 2 have been narrowed down. Therefore, even when the presence range of the transmitter 2 is narrowed down, a decrease in the estimation accuracy regarding the position of the transmitter 2 can be alleviated. This enables to estimate the presence position of the transmitter 2 without the need of the receiver 3 in each area of the plurality of the areas A11 to A44.

Further, the entirety of the area R where the estimation is performed is divided into a plurality of the areas A11 to A44 that are arranged in a matrix form. After doing that, the control unit 4 narrows down the presence range of the transmitter 2 in a step-by-step manner by the bisection method in the X direction and the Y direction and determines one area as the presence position of the transmitter 2. This enables the control unit 4 to determine each of the presence position of the transmitter 2 in the X direction and the presence position of the transmitter 2 in the Y direction using the bisection method, thereby enabling to determine one area from among the plurality of areas A11 to A44 arranged in a matrix form as the presence position of the transmitter 2.

Figure 7:
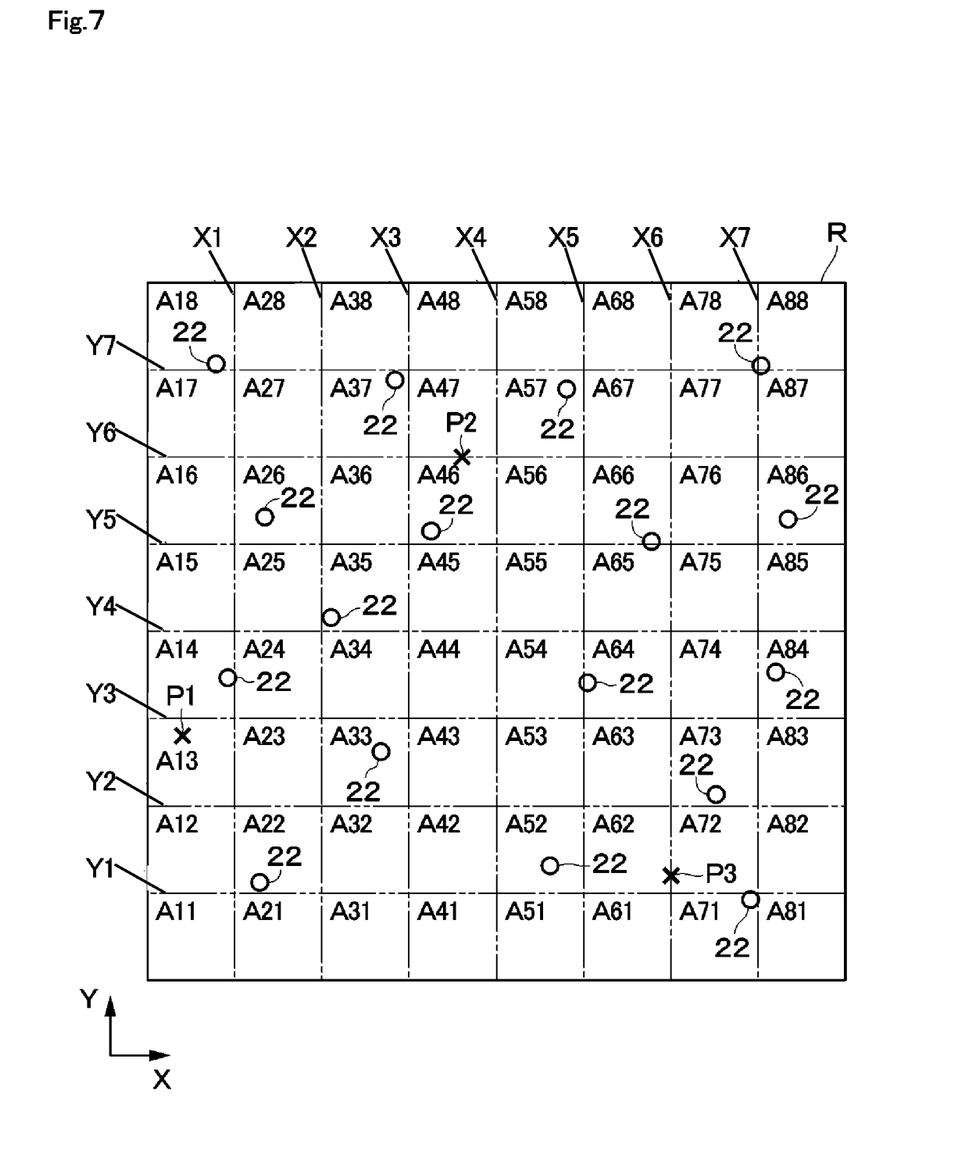
FIG. 7 is an explanatory diagram illustrating an arrangement of the receivers in the second embodiment.

Next, FIG. 1 and FIG. 7 illustrate a position estimation system according to a second embodiment of the present disclosure. A characteristic feature of the second embodiment lies in that the number of areas included in the area and the number of the receivers are different. Note that in the second embodiment, the same reference code denotes the same configuration element as that of the first embodiment, and the description thereof is omitted.

A position estimation system 21 according to the second embodiment is configured substantially similar to the position estimation system 1 according to the first embodiment. Therefore, the position estimation system 21 is configured to include receivers 22, a control unit 23, and the like. Note that however the second embodiment is different from the first embodiment in the number of areas included in the area R and the number of the receivers 22. Specifically, in the second embodiment, the area R includes 64 areas A11 to A88, and one area is determined using 17 receivers 22.

The receiver 22 is configured in a similar manner to the receiver 3 according to the first embodiment. A plurality (for example, 17 units) of the receivers 22 are placed at positions different from each other in the area R in which the position of the transmitter 2 is determined. The receiver 22 receives a radio wave transmitted from the transmitter 2. At this time, the receiver 22 obtains a value of the received signal intensity (RSSI value) based on the radio wave from the transmitter 2. The receiver 22 outputs the RSSI value (positioning data) to the control unit 23.

The control unit 23 is configured in a similar manner to the control unit 4 according to the first embodiment. Therefore, the control unit 23 is connected to all the receivers 22 using wired or wireless connection. The control unit 23 receives the RSSI values of the transmitter 2 from all the receivers 22 and estimates the position of the transmitter 2 based on these RSSI values by running the program of the position estimation process illustrated in FIG. 3 and FIG. 4. Further, the control unit 23 estimates the presence position of the transmitter 2 using machine learning from advance data. Specifically, the control unit 23 determines one area of the 64 areas A11 to A88 included in the area R based on the RSSI values of the transmitter 2 output from all the receivers 22.

As illustrated in FIG. 7, in the second embodiment, the area R is divided into eights in each of the X direction and the Y direction. As a result, in the area R, the total of 64 areas A11 to A88 are formed. At this time, the subscript x of area Axy corresponds to a position in the X direction and increases its numerical value from one side of the X direction (left side of FIG. 7) to the other side of the X direction (right side of FIG. 7). The subscript y of area Axy corresponds to a position in the Y direction and increases its numerical value from one side of the Y direction (lower side of FIG. 7) to the other side of the Y direction (upper side of FIG. 7).

Figure 8:
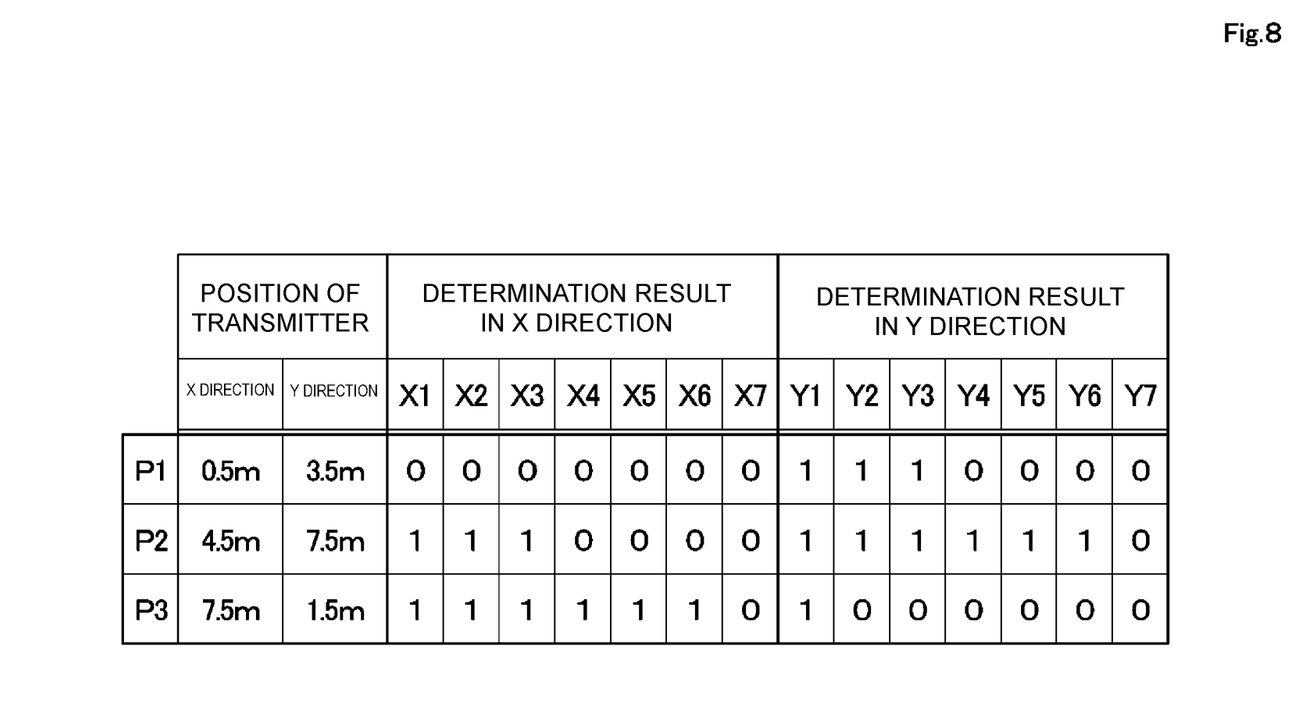
FIG. 8 is an explanatory diagram illustrating relationships between the position of the transmitter and determination results in the X direction and the Y direction.

FIG. 8 illustrates relationships between the position of the transmitter 2 and the determination results in the X direction and the Y direction when the control unit 23 estimates the position of the transmitter 2. At this time, it is assumed that a squire area, one side of which is 10 m in length, is divided into eights in each of the X direction and the Y direction. Middle positions X1 to X7 in the X direction indicate positions at which the bisection method is applied in the X direction. The middle position X1 is a position of 1.25 m in the X direction. The middle position X2 is a position of 2.5 m in the X direction. The middle position X3 is a position of 3.75 m in the X direction. The middle position X4 is a position of 5 m in the X direction. The middle position X5 is a position of 6.25 m in the X direction. The middle position X6 is a position of 7.5 m in the X direction. The middle position X7 is a position of 8.75 m in the X direction.

Similarly, a middle position Y1 is a position of 1.25 m in the Y direction. A middle position Y2 is a position of 2.5 m in the Y direction. A middle position Y3 is a position of 3.75 m in the Y direction. A middle position Y4 is a position of 5 m in the Y direction. A middle position Y5 is a position of 6.25 m in the Y direction. A middle position Y6 is a position of 7.5 m in the Y direction. A middle position Y7 is a position of 8.75 m in the Y direction.

Further, when the determination result is equal to "1" for the X direction, the determination result indicates that it is determined that the transmitter 2 is present in an area further away from the origin (0 m) in the X direction than the corresponding middle position. On the other hand, when the determination result is equal to "0" for the X direction, the determination result indicates that it is determined that the transmitter 2 is present in an area closer to the origin (0 m) in the X direction than the corresponding middle position. The determination result in the X direction corresponds to the process in step 3 of FIG. 3.

Similarly, when the determination result is equal to "1" for the Y direction, the determination result indicates that it is determined that the transmitter 2 is present in an area further away from the origin (0 m) in the Y direction than the corresponding middle position. On the other hand, when the determination result is equal to "0" for the Y direction, the determination result indicates that it is determined that the transmitter 2 is present in an area closer to the origin (0 m) in the Y direction than the corresponding middle position. The determination result in the Y direction corresponds to the process in step 9 of FIG. 4.

Referring to FIG. 7 and FIG. 8, a position estimation procedure of the transmitter 2 is described, as an example, for the case where the transmitter 2 is placed at a position P1 located at 0.5 m in the X direction and 1.25 m in the Y direction.

Firstly, the position estimation procedure of the transmitter 2 in the X direction is described. First, the areas A11 to A88 are divided into halves at the middle position X4 of the entire area, and it is determined whether the probability that the transmitter 2 is present in one of the two divided areas, the areas A51 to A88, is higher or not. Since the determination result for the middle position X4 is equal to "0", the control unit 23 determines that the transmitter 2 is present in the areas A11 to A48 which are closer to the origin in the X direction than the middle position X4. Therefore, the areas A11 to A48 are divided into halves at the middle position X2 which is closer to the origin in the X direction than the middle position X4, and it is determined whether the probability that the transmitter 2 is present in one of the two divided areas, the areas A31 to A48, is higher or not. Since the determination result for the middle position X2 is equal to "0", the control unit 23 determines that the transmitter 2 is present in the areas A11 to A28 which are closer to the origin in the X direction than the middle position X2. Therefore, the areas A11 to A28 are divided into halves at the middle position X1 which is closer to the origin in the X direction than the middle position X2, and it is determined whether the probability that the transmitter 2 is present in one of the two divided areas, the areas A21 to A28, is higher or not. The determination result for the middle position X1 is equal to "0". As a result, the control unit 23 estimates that the transmitter 2 is present in the range closer to the origin in the X direction than the middle position X1, which is the areas A11 to A18 located between 0 m and 3.5 m inclusive in the X direction.

Secondly, the position estimation procedure of the transmitter 2 in the Y direction is described. First, the areas A11 to A88 are divided into halves at the middle position Y4 of the entire area, and it is determined whether the probability that the transmitter 2 is present in one of the two divided areas, the areas A15 to A88, is higher or not. Since the determination result for the middle position Y4 is equal to "0", the control unit 23 determines that the transmitter 2 is present in the areas A11 to A84 which are closer to the origin in the Y direction than the middle position Y4. Therefore, the areas A11 to A84 are divided into halves at the middle position Y2 which is closer to the origin in the Y direction than the middle position Y4, and it is determined whether the probability that the transmitter 2 is present in one of the two divided areas, the areas A13 to A84, is higher or not. Since the determination result for the middle position Y2 is equal to "1", the control unit 23 determines that the transmitter 2 is present in the areas A13 to A84 which are further away from the origin in the Y direction than the middle position Y2. Therefore, the areas A13 to A84 are divided into halves at the middle position Y3 which is further away from the origin in the Y direction than the middle position Y2, and it is determined whether the probability that the transmitter 2 is present in one of the two divided areas, the areas A14 to A84, is higher or not. The determination result for the middle position Y3 is equal to "1". As a result, the control unit 23 estimates that the transmitter 2 is present in the range between the middle position Y3 and the middle position Y4, which is the areas A14 to A84 located between 3.75 m and 5 m inclusive in the Y direction.

From the foregoing estimation results in the X direction and the Y direction, the control unit 23 estimates, as the presence position of the transmitter 2, that the transmitter 2 is present in the areas A14 located between 0 m and 3.5 m inclusive in the X direction and between 3.75 m and 5 m inclusive in the Y direction.

Note that according to the determination results illustrated in FIG. 8, for example, in the case where the transmitter 2 is placed at the position P1 located at 0.5 m in the X direction and the 3.5 m in the Y direction, the control unit 23 estimates the position in the Y direction with an error. However, even in the case where there is an error or a contradiction in the determinations on the middle positions X1 to X7 or the middle positions Y1 to Y7, estimating the position based on the bisection method from the entire area enables to ensure the determination of one area.

The control unit 23 also estimates the presence position of the transmitter 2 using a position estimation procedure similar to the one described above for the case where the transmitter 2 is placed at a position P2 located at 4.5 m in the X direction and 7.5 m in the Y direction and for the case where the transmitter 2 is placed at a position P3 located at 7.5 m in the X direction and 1.5 m in the Y direction.

According to this, in the case where the transmitter 2 is placed at the position P2 located at 4.5 m in the X direction and 7.5 m in the Y direction, the control unit 23 estimates that the transmitter 2 is located in the area A47 between 3.75 m and 5 m inclusive in the X direction and between 7.5 m and 8.75 m inclusive in the Y direction.

Further, in the case where the transmitter 2 is placed at the position P3 located at 7.5 m in the X direction and 1.5 m in the Y direction, the control unit 23 estimates that the transmitter 2 is located in the area A72 between 7.5 m and 8.75 m inclusive in the X direction and between 1.25 m and 2.5 m inclusive in the Y direction.

As described above, the control unit 23 estimates that, with respect to the X direction, the transmitter 2 is in the boundary position (area) where the determination result changes from "0" to "1" or "1" to "0". Further, the control unit 23 estimates that, with respect to the Y direction, the transmitter 2 is in the boundary position (area) where the determination result changes from "0" to "1" or "1" to "0".

Note that FIG. 8 illustrates exemplary cases where the determination results include less errors and contradictions. However, even in the case where more errors and the like are included in the determination results, one area can be determined as the position of the transmitter 2. This enables to increase the reliability or stability in the position determination and prevent the position of the transmitter 2 from being undetermined.

Thus, even in the second embodiment, functions and effects substantially similar to those of the first embodiment can be obtained.

Figure 9:
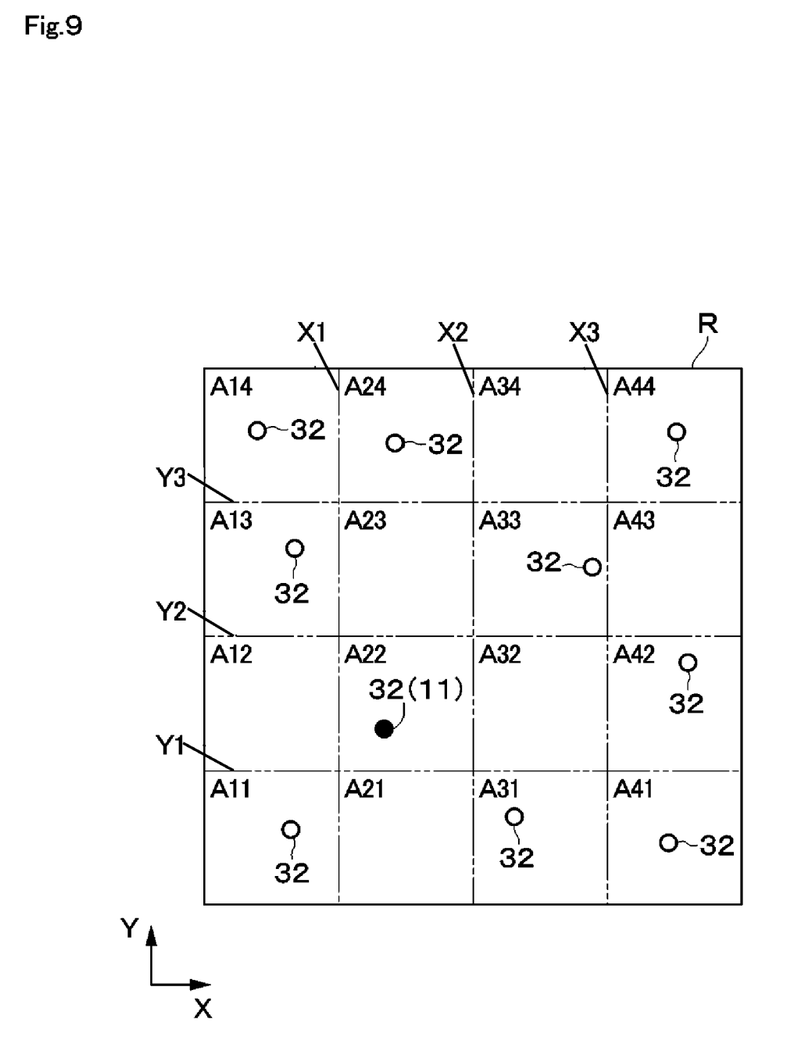
FIG. 9 is an explanatory diagram illustrating an arrangement of the receivers in the third embodiment.

Next, FIG. 1 and FIG. 9 illustrate a position estimation system according to a third embodiment of the present disclosure. A characteristic feature of the third embodiment lies in that the control unit obtains the advance data for machine learning by using one of a plurality of receivers as a transmitter. Note that in the third embodiment, the same reference code denotes the same configuration element as that of the first embodiment, and the description thereof is omitted.

A position estimation system 31 according to the third embodiment is configured substantially similar to the position estimation system 1 according to the first embodiment. Therefore, the position estimation system 31 is configured to include receivers 32, a control unit 33, and the like. Note that however the receiver 32 has the capability of the transmitter 11. The third embodiment is different from the first embodiment in this point.

The receiver 32 is configured in a similar manner to the receiver 3 according to the first embodiment. Therefore, the receiver 32 constitutes a fixed station placed at a predetermined location. A plurality of the receivers 32 are placed at positions different from each other in the area R in which the position of the transmitter 2 is determined. The receiver 32 receives a radio wave transmitted from the transmitter 2. At this time, the receiver 32 obtains a value of the received signal intensity (RSSI value) based on the radio wave from the transmitter 2. The receiver 32 outputs the RSSI value (positioning data) to the control unit 33.

Note that however the receiver 32 also has the capability of the transmitter 11 for obtaining the advance data. Therefore, when the control unit 33 obtains the advance data, one of the plurality of receivers 32 is used as the transmitter 11.

When the one of the receivers 32 functions as the transmitter 11 and transmits a radio wave, the remaining receivers 32 (9 units) receives this radio wave. Therefore, the control unit 33 obtains data of the RSSI values from the remaining receivers 32 as the advance data. The control unit 33 performs machine learning on the correspondence relationship between the RSSI values of all the receivers 32 and the transmitter 2 based on the advance data obtained beforehand.

At the time of estimating the position of the transmitter 2, the area R is narrowed down in a step-by-step manner by the bisection method using the RSSI values from all the receivers 32 based on the result of learning based on the advance data obtained beforehand, thereby determining the area of the minimum unit where the transmitter 2 is present.

Thus, even in the third embodiment, functions and effects substantially similar to those of the first embodiment can be obtained. Further, in the position estimation system 31 according to the third embodiment, the control unit 33 obtains the advance data for machine learning by using one of the plurality of receivers 32 as the transmitter 11. Therefore, when the advance data are obtained, it is not necessary to prepare the transmitter 11 separately from the receivers 32.

Note that in the first to third embodiments, the presence position of the transmitter is estimated by narrowing down the presence range of the transmitter in a step-by-step manner by the bisection method in both the X direction and the Y direction. However, the present disclosure is not limited thereto, and non-orthogonal coordinate axes may also be used in an area having any arbitrary shape. Further, in the case where the area is a long narrow area such as, for example, an underground passage, the presence position of the transmitter may be estimated by narrowing down the presence range of the transmitter in a step-by-step manner by the bisection method only in one direction.

Further, in the first embodiment, the control unit 4 uses the data of the radio waves received by all the receivers 3 at the time of estimating the position of the transmitter 2. However, all the receivers 3 are not necessarily to receive a radio wave from the transmitter 2 located within the area R all the time. Some of the plurality of the receivers 3 may be unable to receive a radio wave from the transmitter 2. For example, the receiver 3 placed at a position away from the transmitter 2 may be unable to receive a radio wave from the transmitter 2. The control unit 4 estimates the position of the transmitter 2 by considering both data that are the data from the receivers 3 capable of receiving and the data from the receivers 3 unable to receive. The point described above applies similarly to the position estimation systems 21 and 31 according to the second and third embodiments.

Further, each embodiment is an example, and for example, the number of areas and the number of the receivers included in the area R may appropriately vary depending on a requirement specification such as accuracy of position estimation and the like.

Next, the disclosure included in the foregoing embodiments is described. The present disclosure is a position estimation system including a plurality of receivers that receive a radio wave from a transmitter and a control unit connected to these receivers using wired or wireless connection, wherein the control unit estimates a presence position of the transmitter using machine learning from advance data obtained beforehand, and the presence position of the transmitter is estimated by narrowing down a presence range of the transmitter in a step-by-step manner by a bisection method using data of the radio waves received by all the receivers.

According to the present disclosure, the control unit narrows down the presence range of the transmitter in a step-by-step manner by the bisection method and estimate the presence position of the transmitter. Therefore, compared with the case where the presence position of the transmitter is estimated using single estimation processing, stability of the estimated position of the transmitter is further facilitated, and one area can be determined in the end. Further, at the time of narrowing down the presence range of the transmitter, if only the data from the receivers inside a narrowed range are used, the number of the receivers gradually decreases. Thus, the position estimation accuracy decreases. Whereas, in the present disclosure, even when the presence range of the transmitter is narrowed down, the presence position of the transmitter is estimated by using the data of the radio waves received by all the receivers. Therefore, even when the presence range of the transmitter is narrowed down, a decrease in estimation accuracy regarding the position of the transmitter can be alleviated. This enables to estimate the presence position of the transmitter without the need of the receiver in each area of a plurality of the areas (receiving area).

In the present disclosure, the entirety of the area where a position of the transmitter is estimated is divided by a perfect power of 2 in the X direction and the Y direction that are orthogonal to each other in such a manner as to divide the area into a plurality of areas arranged in a matrix form, and the control unit narrows down the presence range of the transmitter in a step-by-step manner by the bisection method in the X direction and the Y direction using the data of the radio waves received by all the receivers and determines one of the plurality of areas as the presence position of the transmitter.

According to the present disclosure, the entirety of the area where the estimation is performed is divided into a plurality of areas arranged in a matrix form. After doing that, the control unit narrows down the presence range of the transmitter in a step-by-step manner by the bisection method in the X direction and the Y direction and determines one area as the presence position of the transmitter. This enables the control unit to determine each of the presence position of the transmitter in the X direction and the presence position of the transmitter in the Y direction using the bisection method, thereby enabling to determine one area from among the plurality of areas arranged in a matrix form as the presence position of the transmitter.

In the present disclosure, the control unit obtains the advance data for machine learning using one of the plurality of receivers as the transmitter.

According to the present disclosure, the control unit obtains the advance data for machine learning by using one receiver of a plurality of receivers as a transmitter. Therefore, when the advance data are obtained, it is not necessary to prepare the transmitter separately from the receivers.

1, 21, 31 Position estimation system
2, 11 Transmitter
3, 22, 32 Receiver
4, 23, 33 Control unit

The invention claimed is:

1. A position estimation system including a plurality of receivers that each receive a radio wave from a transmitter and a control unit connected to the plurality of receivers using wired or wireless connection, wherein
  the control unit estimates a presence position of the transmitter using machine learning from advance data obtained beforehand, and
  the presence position of the transmitter is estimated by narrowing down a presence range of the transmitter in a step-by-step manner by a bisection method in a X direction and a Y direction that are orthogonal to each other using data of the radio waves received by all of the plurality of receivers, wherein
  an entirety of an area where the presence position of the transmitter is estimated is divided by a perfect power of 2 in a X direction and a Y direction that are orthogonal to each other to divide the area into a plurality of areas arranged in a matrix form, and
  the control unit determines one of the plurality of areas as the presence position of the transmitter.

2. The position estimation system according to claim 1, wherein the control unit obtains the advance data for the machine learning by using one of the plurality of receivers as the transmitter.

3. The position estimation system according to claim 2, wherein the control unit obtains values of received signal intensity (RSSI values) from remaining receivers as the advance data.

4. The position estimation system according to claim 1, wherein the transmitter is a movable wireless terminal.

5. The position estimation system according to claim 1, wherein each of the plurality of receivers is placed at a different position in the area where the presence position of the transmitter is estimated.

6. The position estimation system according to claim 1, wherein each of the plurality of receivers obtains a value of a received signal intensity (RSSI value) based on the radio waves from the transmitter.

7. The position estimation system according to claim 6, wherein each of the plurality of receivers outputs the RSSI value based on the radio wave from the transmitter as positioning data to the control unit.

8. The position estimation system according to claim 6, wherein the control unit receives the RSSI value from each of the plurality of receivers and estimates the presence position of the transmitter based on the received RSSI values.

9. The position estimation system according to claim 6, wherein the control unit performs the machine learning using the advance data for which coordinates are known and determines a correspondence relationship between the RSSI values of all receivers and coordinates of a location of the transmitter.

10. The position estimation system according to claim 6, wherein the control unit narrows down the presence range of the transmitter using the RSSI values received from all receivers.

11. The position estimation system according to claim 1, wherein the advance data are data of received signal intensity (RSSI) values when the transmitter is placed at a predetermined position within the area.

12. The position estimation system according to claim 1, wherein the machine learning uses a support vector machine (SVM) or a decision tree algorithm.

13. The position estimation system according to claim 1, wherein at least one of the plurality of receivers is placed outside the area where the presence position of the transmitter is estimated.

14. The position estimation system according to claim 13, wherein at least one of the plurality of receivers is placed within a range where the radio wave from the transmitter can be received.

15. The position estimation system according to claim 1, wherein at least one of the plurality of receivers is placed at a position away from the transmitter.

16. The position estimation system according to claim 15, wherein the at least one of the plurality of receivers placed at the position away from the transmitter does not receive the radio wave from the transmitter.

17. A position estimation system including a plurality of receivers that each receive a radio wave from a transmitter and a control unit connected to the plurality of receivers using wired or wireless connection, wherein the control unit estimates a presence position of the transmitter using machine learning from advance data obtained beforehand, and the presence position of the transmitter is estimated by narrowing down a presence range of the transmitter in a step-by-step manner by a bisection method using data of the radio waves received by all of the plurality of receivers, wherein an entirety of an area where the presence position of the transmitter is estimated is divided into eights in a X direction and a Y direction that are orthogonal to each other to divide the area into a plurality of areas arranged in a matrix form, and the control unit narrows down the presence range of the transmitter in the step-by-step manner by the bisection method in the X direction and the Y direction using the data of the radio waves received by all receivers and determines one of the plurality of areas as the presence position of the transmitter.

18. The position estimation system according to claim 17, wherein the advance data are data of received signal intensity (RSSI) values when the transmitter is placed at a predetermined position within the area.

\* \* \* \* \*